Figure 1:
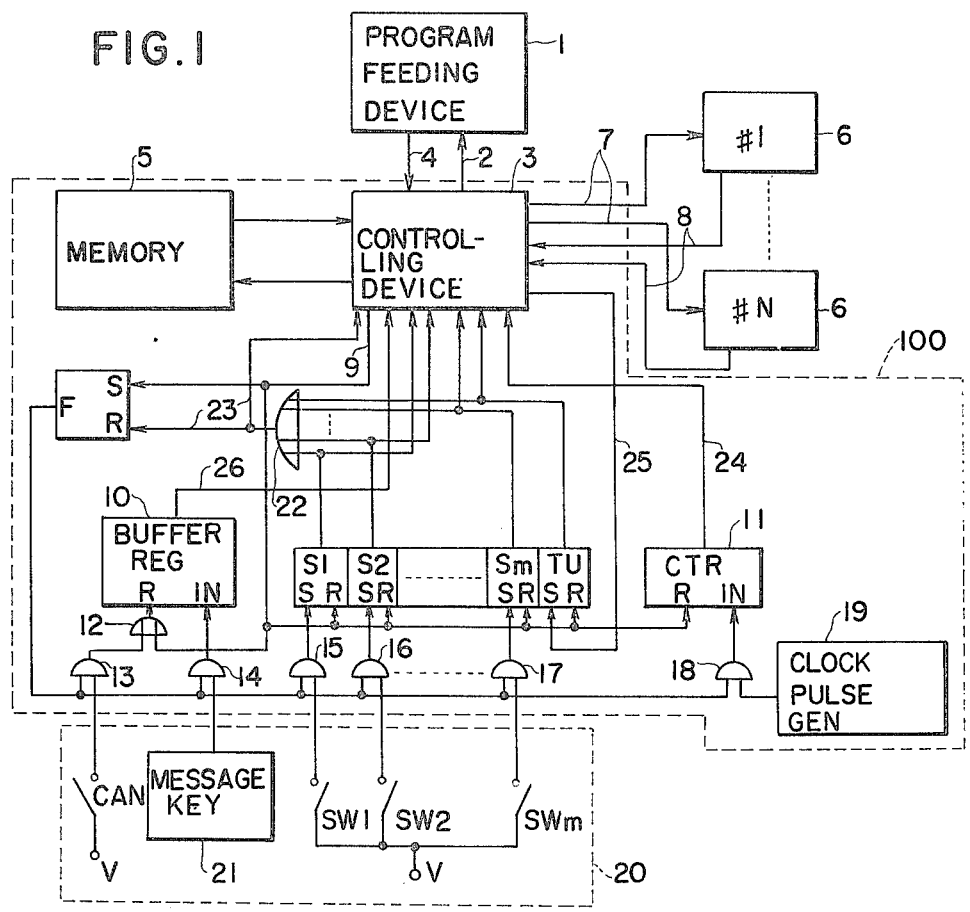

United States Patent [19]

Tsuda et al.

[11] 3,999,307
[45] Dec. 28, 1976

[54] TEACHING MACHINE

[75] Inventors: Junji Tsuda, Hachioji; Chiakafusa Hirano, Tokyo, both of Japan

[73] Assignee: Hitachi, Ltd., Japan

[22] Filed: Aug. 6, 1971

[21] Appl. No.: 169,614

[30] Foreign Application Priority Data

Aug. 7, 1970    Japan .............................. 45-68669

[52] U.S. Cl. ................................................. 35/9 A
[51] Int. Cl.² ......................................... G09B 7/04
[58] Field of Search ............... 35/6, 9 A, 9 R, 31 C, 35/35 C, 48 R, 8 R, 8 A

[56] References Cited
UNITED STATES PATENTS

| | | | |
|---|---|---|---|
| 3,114,210 | 12/1963 | Uttal | 35/6 |
| 3,371,321 | 2/1968 | Adams | 35/8 R X |
| 3,460,270 | 8/1969 | Blitz et al. | 35/6 |
| 3,584,398 | 6/1971 | Meyer | 35/6 |
| 3,623,157 | 11/1971 | Stapleford | 35/9 A |
| 3,629,956 | 12/1971 | Thomas et al. | 35/9 A |

*Primary Examiner*—Richard C. Pinkham
*Assistant Examiner*—Vance Y. Hum
*Attorney, Agent, or Firm*—Craig & Antonelli

[57]. ABSTRACT

An instructional device in the form of a special purpose computer comprising a display device for displaying teaching materials and other information, a keyboard for the student to make a response to the given information, and a control circuit; wherein said control circuit decodes in sequence the orders supplied in the form of program, provides the student with necessary teaching materials, reads the response from the student, judges the read response, and determines the program to be executed in the next place according to the judged result. This instructional device makes a great teaching freedom available to meet the individual abilities of the students.

14 Claims, 7 Drawing Figures

INVENTOR
JUNJI TSUDA
BY Craig, Antonelli & Hill
ATTORNEYS

FIG. 3a PRESENTATION
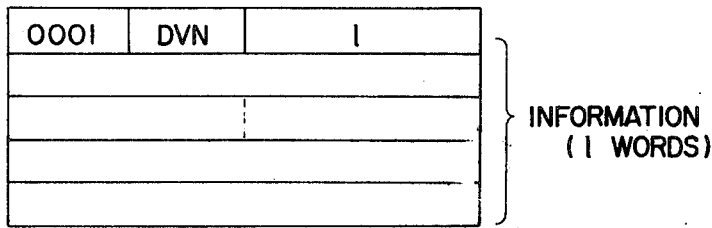
INFORMATION (l WORDS)
FIG. 3b PAUSE
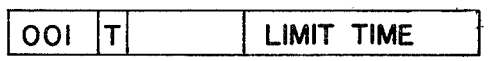
FIG. 3c (1) LOAD JUDGE
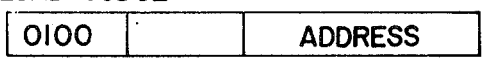
(2) STORE
(3) ADD
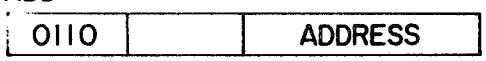
(4) SUBTRACT
(5) ARITHMETIC RESULT JUDGE
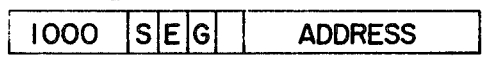
(6) RESPONSE JUDGE
(7) MESSAGE JUDGE
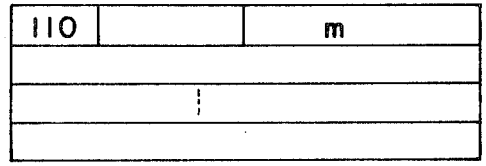
EXPECTED MESSAGE (m WORDS)
(8) UNCONDITIONAL BRANCH
FIG. 3d REQUEST
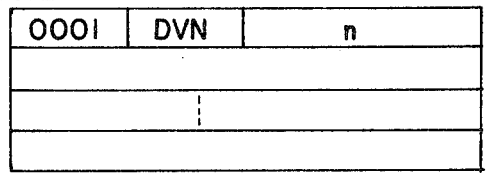
DATA FOR DISCRIMINATING (n WORDS)
INVENTOR
JUNJI TSUDA
BY Craig, Antonelli & Hill
ATTORNEYS

TEACHING MACHINE

This invention relates to instructional devices or teaching machines. The invention relates more particularly to an instructional device through which the teacher presents teaching materials to his students by way of a suitable medium such as by character, figure and voice according to a predetermined program, and asks the students to respond to the presented materials. The device is operated to determine suitable teaching material according to the response from the student and thus permits the students to effectively receive education according to their individual abilities.

Instructional devices have been provided in various types in the art, ranging from a simple one using no electrical circuits to a type associating an electronic computer to perform complex educational functions.

A simple type of instructional device is operable only in certain fixed modes and is, therefore simple in function. In this type of device, therefore, the application field is limited and the educational effect is low.

Generally, the educational effect can be increased by increasing the freedom of selecting the teaching procedures to meet the ability of each student according to the program determined by the teacher. The simple teaching device has little freedom of education and makes only a limited education effect available.

On the other hand, an instructional device employing an electronic computer is greatly versatile with respect to its teaching function and can provide an optimum educational approach according to the ability and understanding of the individual student. In the art, therefore, this instructional device is considered to be quite promising.

Presently, however, this device has many drawbacks. For example, a large setup is required to organize an instructional system and, inevitably, the cost is high. As a result this instructional device is usable only for special applications. In the prior art, the electronic computer is used only as a control device for controlling the student terminals according to the program determined by the teacher. Thus, it is apparent that the prior art fails to make the best use of computer capability. In the art, the student terminal is used without modifications and, as a result, the computer ought to deal with data only with respect to the controlling of the student terminals.

In short, conventional instructional devices are not practical enough; the simple type is lacking in versatility with respect to the teaching function, and the other type is costly and deficient in the effective use of computer capability.

Accordingly, a general object of this invention is to provide an instructional device to enable the student to respond to the given information, and a control circuit for arbitrarily modifying the operation mode of the device by program means.

The control circuit comprises logic circuits for decoding the order supplied in the form of program from the program-feeding device, and performing a specific operation designated by the order. Based on the result of the operation performed on the given program, the control circuit sends the program-feeding device a designation of the program and a request for program supply. More specifically, the control circuit decodes in sequence the orders supplied in terms of program from the program-feeding device and executes the order, thereby operating the display device, through which the teaching materials are presented to the students, and then the control circuit reads and judges the response from the students, determines the program to be executed in the next place according to the judged result, and sends a request to the program-feeding device for the supply of necessary program.

The control circuit also comprises a memory device for storing both the programs supplied from the program-feeding device and the information showing the learning process, which information is obtained as a result of execution of the given program, and a logic circuit for sequentially decoding the supplied programs and controlling the device in response to the corresponding order indicated in the program. According to the invention, the memory for temporarily storing the program in not needed depending on the type of the program-feeding device.

Figure 2:
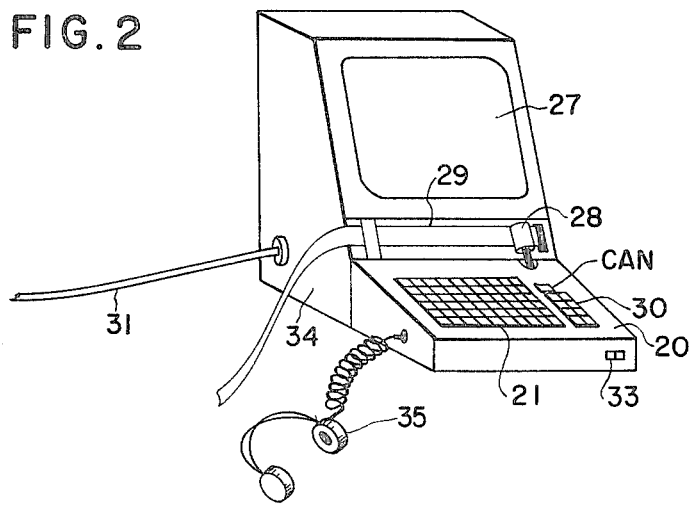
Figure 4:
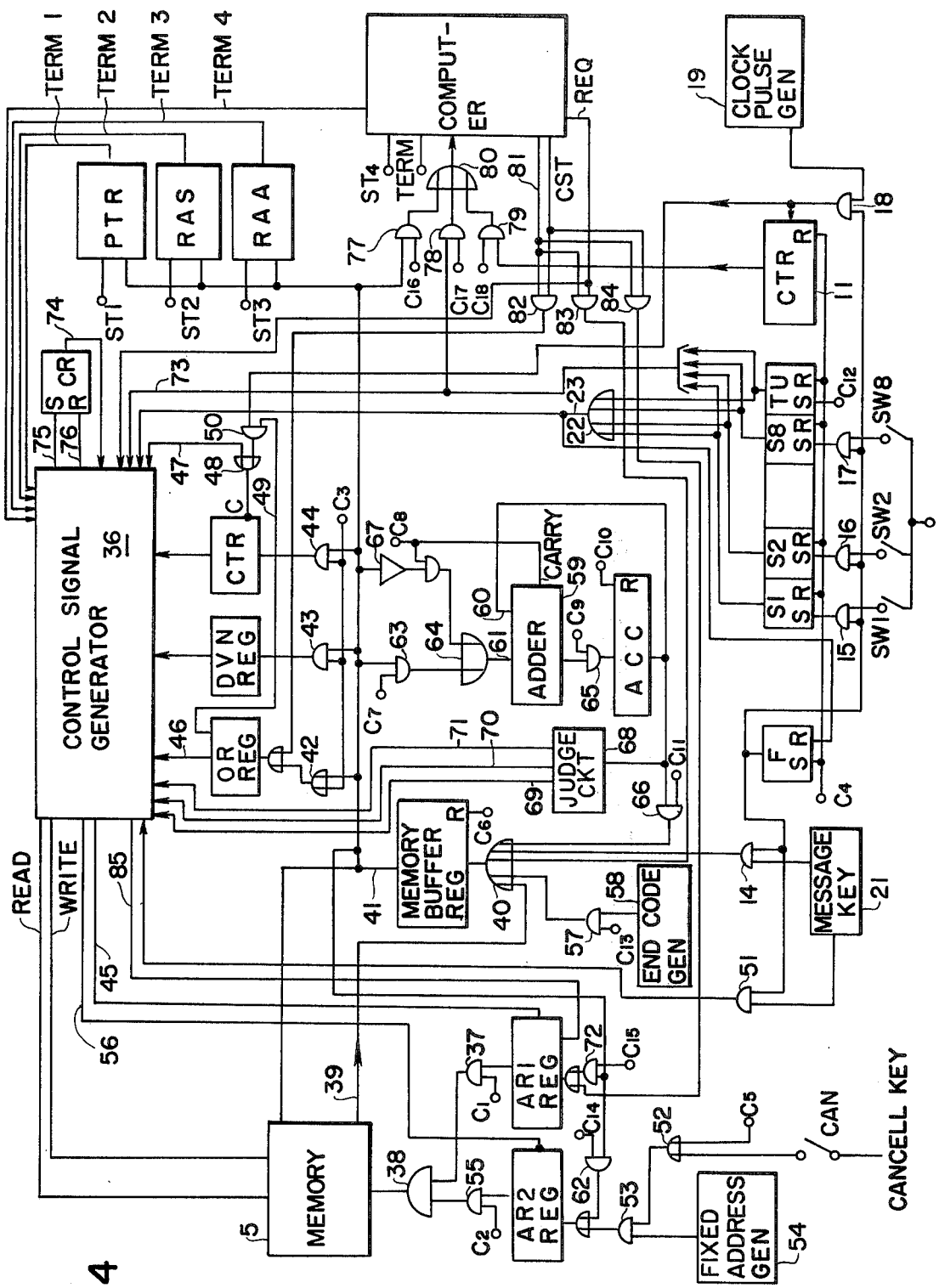

The other object, features and advantages of the invention will be apparent from the following detailed description when read in conjunction with the accompanying drawings:

FIG. 1 is a block diagram showing the fundamental arrangement of a device of this invention, FIG. 2 is an external view showing a device of this invention, FIGS. 3a–3d formats of the orders used fofr the purpose of this invention; and FIG. 4 is a block diagram showing an embodiment of this invention.

Referring to FIG. 1, there is shown the fundamental arrangement of a device of this invention. The terms "step", "order" and "program" used in this specification are defined as follows.

Step

A step is a cycle in the process repeated for advancing the education using a teaching machine. Three steps are used where 1. the device presents a teaching information to the student,
2. the student responds to the given information, and
3. the device judges the student's response and determines the next teaching material based on the juded result.

Order

An order is control information for the function elements which organize a teaching device to perform specific operations.

Program

A program is a group of orders for the entire teaching device to perform specific operations for educational purposes.

The device of FIG. 1 comprises a program-feeding device 1, a display device 6, and a keyboard 20, and a control circuit 100.

The supply of programs from the program-feeding device can be considered as an order or step. For explanatory simplicity, the program supply is hereinafter considered as a step.

The individual components of the device of this invention will be described below.

Program-feeding Device 1

This device is provided with a memory device capable of storing all the programs of one text or a plurality of texts and is operated to send out the program corresponding to one step in response to the request from the control device 3. The program for a specific step is selected from among all the programs stored in the memory device. This is done in a known manner- namely, by designating the identification given to the program of each step or by designating the address of the memory device, at which address the necessary program is stored. For a so-called branch instruction, it is necessary for the program-feeding device to have a function (i.e., random access function) permitting arbitrary readout of the stored program at a high speed, regardless of the order of program storage.

One of the known program-feeding devices may be used. For example, the simplest program-feeding device employs a tape or card as the program storing medium, and a tape reader or card reader is used to feed the program. This type of program-feeding device is not suited for application where highly versatile educational operation is essential, because it is difficult for this device to have a random access function. However, this program-feeding device is applicable to simple educational operation.

According to this invention, a high-speed large-capacity memory such as a drum or disk may be used. Because of large capacity and high speed random access function, this type of memory is suited for applications where many teaching devices are connected to one memory, and programs are supplied to the individual teaching devices on a time-sharing basis.

According to this invention, a typical electronic computer may be used for the program-feeding purpose. In this case, the core memory or peripheral memory of the computer is used for storing the program, and the program selection logic is done by the computer software.

Furthermore, a magnetic tape device may be used wherein the program is read from the tape. Also, the invention allows for the use of a device in which the code expressing the program is printed on a slide, and the program is read from the slide by optoelectric scanning.

In short, what is essential for the program-feeding device is its capability of storing all the programs and selecting the program for one step in response to a request from the control device 3. Thus, this program-feeding device can be easily realized by those skilled in the art.

Display Device 6

This device presents the necessary teaching materials to the students in the form of characters, figures or voice. Practically, various types of printers and CRT display devices are used for the character display. Also, a slide projector may be used for displaying characters or figures, and a tape recorder may be used for presentation of voice. Typically, there are two types of display devices; a device such as slide projector and tape recorder in which the information to be displayed is stored, and a device such as printer which needs the supply of information from an external source. In the former type, the control device 3 designates the frame number of the slide which contains the information to be displayed or the frame number of the voice tape. In the latter, the information to be displayed is supplied.

Controlling Device 3

From this device, the signal designating the program is sent to the program-feeding device 1 according to the response from the student, and also, the program supplied from the program-feeding device 1 is sent to the memory device 5. The control device reads the memory contents and supplies the display device 6 with the signal which designates the teaching material to be presented to the student. Thus the controlling or simply control device 3 controls the exchange of orders and information from the program-feeding device 1, memory device 5, display device 6 and keyboard 20.

Memory Device 5

This device stores the program supplied from the program-feeding device 1 through the control device 3. Also, this device is used for temporarily storing various information produced as a result of program execution. To perform these operations, the memory device 5 has both read and write functions. For this purpose, a core memory or register array may be used. The program execution starts upon transfer of the program to the memory device 5. The program is executed in such manner that the orders comprised in the program are sequentially read out from the memory device 5 to the control device 3, the control device decodes the read order and sends a control signal to the corresponding device according to what is indicated by the order, or supplies necessary information to the corresponding device to make this device perform a specific operation. The program request from the control circuit 3 to the program-feeding device 1 is the result of the corresponding order executed by the control circuit 3.

Keyboard 20 and Its Peripheral Devices

The student makes his response through the keyboard 20. The keyboard 20 is equipped with message keys 21 through which the student sends his message such as an answer, response keys SW1, SW2, ... SWm for discriminating the king of the student's response and for indicating the termination of the student's response, and a key CAN for requesting cancellation of an input message. The message keys 21 bear letters, numerals, special symbols, etc. as needed. When a student depresses one of these keys, the code corresponding to the character assigned to the depressed key is sent out. Ths student selects in sequence the characters on the message keys and pushes them, thereby forming the necessary answer or message to be sent to the instructional device.

When the instructional device is in a state of waiting for the response from the student, the flip-flop F is set by the control device 3, through line 9 and the AND gates 13 through 18 are opened. Therefore, the character code from the message key 21 is supplied to the buffer register 10. This buffer register 10 consists of an array of register capable of sequentially storing the supplied character codes. The number of characters (i.e., the length of a message) which can be inserted at each response is limited according to the memory capacity of the buffer register used. In this example, the buffer register 10 is an element provided separate from the memory device 5. It is apparent that part of the memory device 5 may be used in place of the buffer register 10.

The key CAN is used when the student desires cancellation or modification of his once input message. By depressing the key CAN, a reset signal is supplied to the buffer register 10 by way of AND gate 13 and OR gate 12, whereby all the messages which have stored are cancelled. At the same time, the buffer register 10 is reset to the initial state and is ready to store in sequence newly received messages.

When a printer or CRT display device is used for the display device 6, a given message is stored in the buffer register 10 and sent to the display device 6 whereby the message is display on the display device 6. Therefore, the student can confirm his input character and continue his message input procedure. Namely, the student's input message is fed back for confirmation by himself, and the input message can be cancelled or modified. These functions enable the student to confidently converse with the instructional device. In FIG. 1, the connection for applying the message input to the display device is not shown for the sake of explanatory simplicity.

When the student has completed his response he selects and depresses one of the response keys SW1, SW2, . . . SWm, to inform the device of the end of his response. Certain necessary meanings are assigned to the individual response keys. For example, a certain key indicates the end of response, another key expresses the request for a hint, and another key for requesting the solution. What meaning is to be assigned to each key depends on the method of education established by the instructional device. Practically, the key expression is arbitrarily determined by the instructor programmer. The response key is used in two ways; the response key is used independently where the response key directly indicates a response such as for the request for a hint of for a solution, or the response key is used in combination with the message key. In this case, the kind of response is discriminated by the use of a response key, and the detailed contents of the response are expressed by the message key 21. For example, when the student sends an answer, the answer is inserted by way of the message key, and the response key is used to indicate that the given information has been an answer. When the student makes a request for a reference teaching material, the name of the teaching material is inserted by the message key, and the response key is used to indicate that the input has been a request for a reference teaching material.

When one of the response keys is depressed, a set signal is sent out by way of the corresponding one of the AND gates 15, 16, . . . 17, whereby the corresponding one of the flip-flop S1, S2, S3, . . . Sm is set. As a result, a signal appears on the signal line 23 via the OR gate 22, to reset the flip-flop F. At the same time, the control device 3 receives an indication that the response is over. When the flip-flop F is reset, AND gates 13, 14 . . . 18 are closed, the student's response is no longer accepted, no clock pulse is supplied to the counter 11, and count of the student's response time is stopped.

Before the response key is depressed, the student's response time is counted by the counter 11. In this operation, if the limitation on the response time is designated by a pause order, the contents of the counter 11 are sent to the control device 3 via the cable 24, whereby the contents of the counter 11 are compared with the set value of limited time. When the two values are coincident with each other before the response key is depressed, the limited time is up and a signal is sent out via the signal line 25, to set the flip-flop TU. The output of the flip-flop TU resets the flip-flop F via the OR gate 22, as in the case of output of the flip-flop S1, S2, . . . Sm. When the flip-flop F is reset, the student's response is inhibited and the count of the response time is stopped. Namely, "time-up" is treated as a kind of student's response, and the student's response in this step is terminated.

As described abve, when a student depresses the response key or the time is up, the student's response is finished and the flip-flop F is reset, and any further student's response is neglected. In this state, the student's input message is stored in the buffer register 10, and the type of student's response is stored in flip-flop S1, S2, . . . Sm and TU. The contents of the counter 11 indicates the time taken by the student's response. The end of the student's response is informed to the control device 3 via the OR gate 22 and signal line 23.

The major components as shown in FIG. 1 have been described above. This instructional device is operated in the following manner.

As described above, the memory device 5 stores the program corresponding to one step. During one step, the device as shown in FIG. 1 executes the following functions.

1. presentation of necessary teaching information to the student
2. waiting for a response from the student
3. acceptance of the student's response
4. judgement and evaluation on the student's response
5. request for a suitable program of the next step according to the result of (4).

To designate these operations, four types of orders are provided as summarized below.

a. Presentation order.

This order makes the display device supply an instruction and presents this instruction to the student.

b. Pause order.

This order makes the device wait for the student's response and ready to receive the student's response. When it is desired to count the time required for student's response, the timer is actuated by execution of this order.

c. Judge order

This order consists of a group of orders used for judging the result of the student's response or for branching the program according to the result of evaluation on the learning process. More specifically, this order comprises: an order for comparing the answer from a student with the expected answer and for branching the program according to the result of the comparison; and order for the arithmetic and/or logical operation necessary for evaluating the result of study, such as for calculating the mark or a student; an order for storing the result of the evaluation in the memory device; and an order for judging the data stored in the memory device, the contents of the registers and the state of a flip-flop.

d. Request order

This order is for providing information to make a request for a program supply from the program-feeding device 1.

A program is composed of a suitable combination of the above orders so that the device performs specific operations. In principle, the program is set up so that the orders (a), (b), (c) and (d) are executed in this sequence.

The execution of the program stored in the memory device 5 starts. Usually, the presentation order is first executed. When the presentation order is read, one of the display device 6 which is designated by the order is designated by the control device 3. The designated display device thereby displays the teaching material or information designated by the order. Namely, the signal designating the information to be presented is sent from the control device 3 to the designated display device via a cable 7. At the same time, the control device 3 sends a control signal to the designated display device to actuate this display device. The display device performs a specific operation based on the given signal and presents the designated information to the student. The end of this operation is informed to the control device 3 via a cable 8. When the presentation of the designated information from a specific display device is completed, the execution of this presentation order is terminated.

Then the control device 3 starts executing the next order. When this order is another presentation order on another display device, the control device performs the same operation as above on the corresponding display device.

When the execution of a series of presentation orders necessary for the corresponding step is completed, the pause order follows next. The pause order brings the instructional device into a state of waiting for the student's response and to make the device ready to accept the student's response. When it is necessary to limit the time required, for the student to make a response, the value of the limiting time is designated by this pause order.

When the pause order is read out, the control device 3 delivers a signal via the signal line 9. By this, the flip-flop F is set, the buffer register 10 temporarily storing the student's message is reset via the OR gate 12, and the flip-flop group S1, S2, ... Sm, TU and the counter 11 are reset. When the flip-flop F is set, the AND gates 13 through 18 are partially enabled, and the buffer register 10 and flip-flop group S1, S2, Sm and TU are made ready to accept the student's response. The clock generator 19 generates a pulse at certain definite time intervals. When the gate 18 is opened by the signal from the flip-flop F, the pulse from the clock generator 19 is introduced to the counter 11, whereby the pulse is counted. The contents of the counter 11 indicates the time lapse from the beginning of execution of the pause order.

The student makes a response by depressing the key on the keyboard within a specific time interval. The student's procedure for this operation is as described above. The end of the student's response is informed to the control device 3 via the OR gate 22 and and signal line 23. Thus, the execution of pause order is terminated.

Then the control device 3 goes over to the next order. Usually, the judge order follows the pause order.

The judge order comprises: and order for judging the given student's response or the data indicating the previous study process stored in the memory device 5 and for branching the program in the memory device 5 according to the result of judgement; an order for calculating the mark, the number of responses, the number of wrong answers, the evaluation on the result of study, etc.; an order for storing in the memory device 5, the data indicating the study process obtained as the result of the above calculation.

The purpose of the program branch order based on the student's response in to check the contents stored in the flip-flops S1, S2, ... Sm and TU, the message stored in the buffer register 10 and, if necessary, the response time stored in the counter 11. The order for judging the flip-flops S1. S2, ... Sm, Tu is to discriminate the kind of response, and to branch the program according to the discriminated result. To execute the order for judging a message, the message stored in the buffer register 10 is read out character by character, and the read data is collated with the expected answer which has been prepared in the memory device 5. When the collation results in a perfect coincidence, the program is branched. When the program branching is desired according to the response requiring time, the contents of the counter 11 are transferred to the control device 3 via the cable 24 and then are treated as data for judgement.

Other orders for evaluation and include an order for arithmetic and/or logical operation on the data stored in the memory device 5 and an order for judging the result of the arithmetic and/or logical operation and for branching the program. By the use of these orders, it is possible to calculate various values indicative of the study process such as, for example, marks, the number of correct answer and the number of wrong answer. It is also possible to branch the program with reference to the study process. Thus, according to the invention, a highly versatile educational approach can be realized. For the usual instructional operation, a small number of simple judge orders will suffice. For example, the judge order includes an order for additional/subtraction of integers, and an order for judging whether the calculated result is positive zero or negative and for branching the program. If necessary, other judge orders may be used to meet specific requirements.

The request order is executed as the last one-step program. The request order is to provide the information which designates the program to be supplied in the next place from the program--feeding device 1 or provide the information which designates the next operation the program-feeding device ought to perform.

The one step program comprises as many request orders as the number of selection branches of the instruction procedure expected in the corresponsing step. Among those request orders, only one is selected and executed as the result of program execution. When the program-feeding device 1 has only the function of supplying the program corresponding to the next step, the information sent to the program-feeding device is the information which designates the program to be supplied in the next place. In this case, when the request order is executed, the control device 3 takes the state of waiting for the next program supply from the program-feeding device 1. While the program-feeding device 1 searches the designated program and sends out this program. By this operation, the instructional device is ready to execute the next step program, and will repeat a series of the foregoing operations.

In the above instructional device, a typical electronic computer may be used as the program-feeding means. When a computer is used, the information sent to the computer according to the request order not only has information designating the program of the next step but also various information which designate data processing to be performed by the computer. The computer discriminates the given information and performs adequate processing operations in response to the request.

In this operation, the purpose of the computer is to supply the next step program to the instructional device. Another important purpose of the computer is to read various information obtained in the instructional device as the result of execution of the previous step program and to process the corresponding data in response to the request. The data which can be read by the computer include the student's input message stored in the buffer register 10, the kind of student's response stored in the flip-flops S1, S2, Sm, Tu, and the evaluated result stored in the counter 11. The data to be read is designated by the computer. The control device, when given the read designation from the computer, reads out the corresponding information from the suitable memory and transfers the read information to the computer.

When it is necessary to feed back the result of the computer processing to the student, the program is to be arranged so that the fed-back information is supplied from the display device.

The advantages expected by the best use of the computer capabilities are as follows.

1. The student's study process is recorded and processed, whereby useful data for further educational guidance can be extracted and various data for educational management can be obtained.
2. The computer is used for processing complicated data which can hardly be handled within the scope of the orders prepared for the instructional device alone, and thus a highly effective instructional approach can be realized.
3. Students can arbitrarily utilize the information stored in the computer.
4. The computer capabilities can directly be utilized. For example, the student himself may write a computer program, call various routines prepared in the computer, ask for a simulation, or make a request for computation.

The fundamental arrangement and operations of the instructional device of this invention have been described above. An embodiment of the invention will be now described in detail.

Referring to FIG. 2, there is shown an external view of the arrangement wherein a computer is used for the program-feeding device.

In this example, a slide projector with a random access function, a printer and a tape recorder with a random access function are used for the display device. In FIG. 2, the reference 27 denotes a screen for displaying a teaching material by slide projection. The references 28 and 29 represent part of the printer; 29 a paper tape on which characters are printed, and 28 a typewriting wheel for printing characters on the paper tape. The paper tape is transported from the left to the right to a distance of one character at each printing. A line of characters are printed on the paper tape. The voice from the random access tape recorder can be picked up by the earphone 35. The student's response is made by means of message keys 21, response keys 30 and key CAN on the keyboard 20. The student form a message such as answer by selecting the message keys. The student, when sending out his message, selects the response key 30, thereby informing the end of response and designating the kind of response at the same time. A message, once given, can be cancelled by the use of CAN key and another input can be set by the student before depressing the response key 30. The message key is interlocked with the printer. Therefore, the input character is printed on the paper tape 29 and fed back to the student for confirmation. The meaning assigned to each response key can be arbitrarily determined according to the method of instuction employed. The program is set up so that the device is operated comforming the assigned meaning.

The random access slide projector, the main unit of the random access tape recorder and the mechanical part of the printer are housed in the cabinet 34. According to the invention, a conventional slide projector, tape recorder and printer may be used. Hence, further description of these components is omitted in this specification. Reference numeral 31 denotes a cable connecting the instructional device and the computer, and 35 a power switch. This switch has another function of resetting the individual component devices to an initial state.

The control circuit of this instructional device is housed in the cabinet 34. The control circuit will specifically be described below.

FIG. 3 illustrates the orders used for the instructional device of this invention. In this device, the information is handled per word unit consisting of 16 bits. One order is made up of one word to several words. The beginning 3 or 4 bits of the first word of an order are the place assigned to the order code by which the kind of order is indicated.

FIG. 4 shows a control circuit embodying the invention. The meanings of the orders shown in FIG. 3 will be described in connection with the operation of the control circuit in FIG. 4.

In FIG. 4, the memory device 5 is a typical core memory having locations arranged in one word (16 bits) unit. The memory location is designated via addresses assigned to the individual memory locations. The address assignment is in the order of arrangement of memory locations in the memory device 5, such as address 1, address 2, The program is always stored in sequentially from the address O and, therefore, the program execution is started from the address O. The program is executed in succession in the storage order until the program branch is designated by the order. In FIG. 4, the control signal generator circuit 36 generates a timing signal which controls transfer of information among the elements organizing the control circuit. The control signal generator 36 also generates a control signal for controlling said elements of the control circuit to perform specific operations. For explanatory simplicity, FIG. 4 shows an expression placing an importance on the flow of information in connection with the operation of the control circuit. To this effect, the matters related to control operation are referred to by simple expression or omitted. The detailed diagrammatical expression for the control signal generator circuit 36 is omitted but to the degree sufficient for those skilled in the art to understand its details by the aid of the following description.

In FIG. 4, the address in which the order to be executed next is stored in the register AR1. This register is structurally a counter. When a pulse signal is applied to its terminal C, 1 is added to the contents of the register AR1. An order is executed in the following manner. First, an order is read from the memory device 5. The control signal generator changes to the order read phase, thereby sending a signal C6 to the reset terminal R of the memory buffer register MBR to reset this register. At the same time, in order to supply the contents of ARI as an address signal to the memory device 5, the control signal generator supplies a signal C1, thereby opening the gate 37. As a result, the address signal reaches the memory device 5 via the OR gate 38.

In the practical circuit, the address is designated by a plurality of bits and, hence, the signal line and gate are provided as many as the number of bits. For the sake of simplicity, one representative signal line and gate are depicted. Similarly, the other circuit elements are simplified for explanatory convenience. Of course, each of the signals C1–C18 is provided by the control signal generator in order to supply the respective enabling signals. In some cases, the connection for the control signal is not shown as in C1 and C6.

When the address of the order is determined in the above manner, the control signal generator 36 delivers an information read signal READ to the memory device 5. As a consequence, the memory device 5 performs an information read operation. The read information is stored in MBR via the cable 39 and OR gate 40. Immediately, the contents of MBR are given to the bus 41. When the information read from the memory device 5 is a non-destructive read-out, the control signal generator 36 delivers a write signal device 5. By this, the read by MBR is written again in the same address. When the order is read by MBR, the signal C3 is supplied and the gates 42, 43 and 44 open. As a result, the first 4 bits of the order, as shown in FIG. 3, are set in the register OR, the following 4 bits in the register DVN and the remainder 8 bits in the subtraction counter COUNT. At the same time, a pulse is sent to the signal line 45, and the address stored in AR1 is increased by 1. Thus the order read phase operation in the control signal generator 36 is completed, and the order execution phase is started.

The order code stored in the register OR is supplied to the control signal generator 36 via the signal line 46 and is decoded by the decoder (not shown diagramatically), whereby the order is discriminated. Then a specific control operation is performed according to the kind of the order. How the instructional device of this invention is operated at the individual orders shown in FIG. 3 will be described below.

In the format of presentation order as in FIG. 3 (a), the initial 4 bits of the first word indicate the order code, and the following 4 bits DVN designate the display device which is to present information. For this display, a slide projector and tape recorder are used. The patterns 0001, 0010 and 0011 are assigned to DVN. The remaining 8 bits designate the word length 1 of information to be sent to the display device. This information is stored immediately after the word indicating the order and is sent to the display device as a word unit. The information designating the display device is set in the register DVN, and the word length 1 in the subtraction counter COUNT. When the execution of a presentation order starts, the control signal generator 36 reads the information of the first word from the memory device 5. Since the contents of AR1 include a 1 which was added at the end of the order read pulse. AR1 indicates the address of the information to be read. The control signal generator 36 supplies signal to input C1 as in the order read phase, to open the gate 37, supplies the address of AR1 to the memory device 5 and sends out a READ signal. The read information is set in MBR. This signal appears on the bus 41. The control signal generator delivers a WRITE signal in order to effect a rewrite operation. Then the control signal generator sends a pulse to the signal line 45, thereby increasing the contents of AR1 by 1. Thus, the control signal generator is ready for the next information read operation. When information is read by MBR and sent out to the bus 41, a strobe signal for initiating a read operation on the information sent over to the bus 41 is delivered from the control signal generator 36 to the display device designated by register DVN. At the same time, a pulse is supplied via the signal line 47 and OR gate 48, whereby the contents of the counter COUNT are decreased by 1. In this state, the contents of the counter COUNT indicate the word length of the remaining information. The strobe signal is applied to the terminals ST1, ST2 and ST3 of the printer PTR, slide projector RAS and tape recorder RAA, respectively. Each display device, when given this strobe signal, starts taking the information present on the bus 41. The information sent to the display device is a character code designating the character to be printed (in the case of printer) or a number designating the frame to be presented (in the case of RAS or RAA). When the display device is in operation, the control signal generator is in the state of waiting for the end of the operation of the display device and does nothing. When the operation of the display device is completed, a signal (TERM1, TERM2 or TERM3 for the typewriter, RAS or RAA, respectively) indicating the end of an operation is supplied to the control signal generator 36. When this siganl is supplied, the control signal generator repeats the same operation as described above if the contents of COUNT are not 0, in order to transfer the succeeding information. When the contents of COUNT equal O, this means that the execution of the corresponding presentation order is over. If so, the operation goes over to another order read phase for read out of the next order.

In the format of the pause order as shown in FIG. 3 (b), the beginning 3 bits of the order word indicate the order code, and the fourth bit T indicates the designation as to whether the time required for the student to make a response is limited or not. When T is O, this indicates no limitation. On the other hand, if T is 1, this indicates a limitation. The value of the limitation time is designated by the remaining 8 bits in second unit. The time designated by 8 bits in 255 seconds maximum. If a longer limitation time is desired, it is necessary to increase the number of bits and also to increase the number of bits of the counter COUNT.

When the order is read, the limited time value is set in the counter COUNT. When the control signal generator 36 enters the order, execution phase, the signals C4 and C5 are generated. By the signal C4, the flip-flop F is set, and the flip-flops S1, S2, . . . TU and the counter 11, which is to count the response requiring time are reset. When the flip-flop F is set, the AND gates 14, 15, 16, 17, 18 and 51 are partially enabled to accept the input character code from the message key 21 and also the input signals from the response keys SW1, SW2, SW8. The pulse of a one second interval generated from the clock generator 19 is applied to the counter 11. By this, counter 11 starts counting the response-requiring time. At the same time, this pulse is delivered to the AND gate 50. When the fourth bit of the register OR is 1 and the limitation on the response time is designated, the pulse is applied also to COUNT since the AND gate 50 is opened via the signal line 49. Thus, each time the pulse is sent in, the contents of COUNT are decreased by 1.

By the signal C5, the AND gate 53 is opened via the OR gate 52, and the fixed address provided from the fixed address generator circuit 54 is set in AR2. This embodiment employs the method in which the fixed region of the memory device 5 is used as the buffer memory for storing the student's input message. The fixed address generated by the fixed address generator 54, is the head address of this fixed region.

The above operation makes the device ready to accept the student's response. When a student depresses one of the message keys, the corresponding character code is sent to MBR via the AND gate 14 and OR gate 40 and then is set therein. At the same time, a pulse signal, indicating the key timing is generated from the message key 21 and sent to the control signal generator 36 via the gate 51. Accordingly, the control signal generator performs its operation, so that the character code stored in MBR is transferred to a specific location of the memory device 5 and that the character code is sent to the printer for printing the character for confirmation by the student. To do this, the control signal generator sends out a signal C2 to partially enable the AND gate 55, whereby the contents of AR2 are supplied as an address to the memory device 5. Then the control signal generator generates a WRITE signal to make the memory device 5 store the character code of MBR is the given address. After this operation, a pulse signal is sent out via the signal line 56, whereby the contents of AR2 are increased by 1. As a result, the contents of AR2 indicate the address in which the succeeding character code is stored. Also, a strobe signal ST1 is supplied to the printer. Then the printer takes the character code presented over the bus 41 and prints out the corresponding character. The above operation is repeated as the student depresses the message keys in succession. Thus the character codes are stored orderly in the fixed region of the memory 5, and the student's input characters are printed on the printer.

The key CAN is depressed when the student desires to cancel his input message. The signal from the key CAN opens the gate 53 via the OR gate 52 whereby the fixed address of the fixed address generator 54 is set in the AR2 and the initial state is restored.

The end of student's response is effected when the student depresses one of the response keys SW1, SW2, ... SW6 or when the limited response requiring time is up.

When the student depresses the response key, one of the corresponding flip-flops S1, S2, ... S8 is set. The output of these flip-flops appears on the signal line 23 via the OR gate 22. This output is then transmitted to the control signal generator 36, and the flip-flop F is reset. By this, the gates 14, 15, 16, 17 and 18 are closed and any further student input is not accepted. At the same time, counting of the response requiring time is stopped.

When the control signal generator 36 receives the response-end signal from the signal line 23, the control generator performs the operation for storing the end-code indicating the end-of-message in the place next to the memory location of the memory device 5, in which memory location the last character code is stored. For this operation, the control signal generator generates a signal C13, thereby opening the AND gate 57, and operates so that the end-code generated by the end code generator 58 is set in MBR via the OR gate 40.

Then the control signal generator sends out a signal C2 and write signal to the memory device 5, whereby the end code is stored in the specific place. Thus, the execution of a pause order is completed, and the control signal generator goes over to the operation of order read phase for reading the next order.

If the time has elapsed under the condition of limited response time, the following operation is performed. The control signal generator monitors the contents of the subtraction counter COUNT. When a O content of COUNT is detected before the student depresses the response key, the control signal generator supplies a signal to input C12 to set the flip-flop TU. By this, a signal appears on the signal line 23 via the OR gate 22. Then the same operation as in the case where the response key is depressed is performed. The operation under the judge order as in FIG. 3 (c) will be described below.

The load order is the order which designates that the information stored in the address designated in the address part of the order word is transferred to the accumulator ACC. When this order is executed a pulse signal is sent to C10 and C14 from the control signal generator 36. By the pulse signal of C10, the accumulator ACC is reset. As a result, the input data applied to the input terminal 60 on the side of the adder circuit 59 becomes O, and as a result of the pulse signal at C14, the AND gate 62 is opened. The control signal generator 36 supplies a signal at C2 to partially enable the gate 55, and supplies the address of AR2 to the memory device 5. At the same time the control signal generator generates a read signal, thereby reading the corresponding data for MBR. Then the control signal generator generates a write signal to rewrite the data. At the moment the data is read out to MBR, a signal is supplied to C7 and the gate 63 is opened. As a result, the read information is applied to the input terminal 61 on the addend side of the adder circuit 59 via the OR gate 64. In this state, the input data applied to the input terminal on the summand side is O and, consequently, the output of the adder circuit is the same as the information read from the memory device. Upon completion of operation of the adder circuit, the control signal generator sends a pulse signal to C9, thereby opening the AND gate 65. Then the resultant information is set in ACC. Thus, the execution of a load order is completed and the control circuit 36 goes over to the operation of order read phase for reading the next order.

The store order is to designate the storing of information of the accumulator ACC in the address indicated by the address part of the order. This order is executed in the following manner. A pulse signal is sent to C14, the gate 62 is opened, and the address part of the store order in MBR is transferred to AR2, as in the case of load order. Then a pulse signal is sent to C11 from the control signal generator 36, and the AND gate 66 is opened, whereby the contents of the accumulator ACC is set in MBR. After this operation, a signal is sent to C2, the address of AR2 is supplied to the memory device 5, and a write signal is delivered, whereby the necessary write operation performed.

The add order is to designate that the numerical data of the address indicated by the address part of the orfer is added to the contents of the accumulator ACC, and the result of this addition is set in the accumulator ACC. This order is executed in the same manner as the load order, except for the following point. In the load order, a pulse signal is sent to C10 before hand, thereby resetting ACC, whereas, in the add order, this operation is not performed.

As a consequence, the contents stored in ACC are applied directly to the summand side input terminal 60 of the adder circuit 59, whereby the necessary addition is operated. In the add order, the value is expressed in terms of the complement of 2.

The subtract order is to designate that the value stored in the address indicated by the address part of the order is subtracted from the value stored in the accumulator ACC, and the subtracted result is set in ACC. This order is executed in the same manner as the add order, except for the following point. Namely, in the add order, a signal is supplied C7 and the value of MBR is applied directly to the adder circuit, whereas, in the subtract order, a signal is supplied to C8. As a result, the value (1,0) of MBR is inverted every bit via the inverter 67 and then applied to the adder circuit 59. The signal C8 is applied as a carrier to the terminal of carrier input to the lowest digit of the adder. Thus, a necessary subtraction operation is performed.

The arithmetic result judge order is executed to judge whether the information (in terms of value) stored in the accumulator ACC is negative, zero or positive and to branch program execution to the addesss designated by the address part of the order word. The bits S, E and G of the order word are used to designate the branch condition. When 1 is set, this shows that program execution is branched under the condition that S is negative, E is zero and G is positive. S, E and G may be designated in an arbitrary combination. The output of ACC is always applied to the judge circuit 68. The 1 output is delivered to the signal lines 69, 70 and 71 according to whether the value of ACC is negative, zero or positive. More concretely, the judge circuit 68 is arranged for the following operation.

Normally, in the accumulator ACC, the most significant bit represents the sign. When the bit is 1, its value is negative. When it is O, the value is non-negative. Hence, the output of the most significant bit appears directly as the output of the signal line 69. The negation output of all bits of the ACC after the AND logic is the output of the signal line 70. The AND logic between the negation output of the most significant bit of the ACC and the negation output of the signal line 70 sends the output on the signal line 71. At the beginning of execution of the order, the data of S, E and G designated by the order are stored in the register DVN. The control signal generator is operated for logical comparison between the designating conditions of S, E, G and the signals of the signal lines 69, 70 and 71, respectively. When both of them are 1 and any coincidence exists between them, this is judged that the branch condition is satisfied. If so, the control signal generator sends a pulse signal to C15 to open the AND gate 72. As a result, the branched address stored in MBR is set in AR1. Thus the execution of this order is completed. If the branch condition is not established, the execution of the order is immediately terminated.

The response judge order is executed, to judge whether the flip-flops S1, S2, S8, TU and the flip-flop CR are set. (The flip-flops S1, S2, S8 are to be set as the result of the student's response, and the flip-flop Cr is set according to the result of execution of the message judge order.) When these flip-flops are set, the response judge order is to branch the program to the address designated by the address part of the order word. The numbers O, 1, 2, . . . 9 are assigned orderly to these flip-flops CR, S1, S2, . . . S8 and TU. The flip-flop to be judged is designated by placing one of these numbers in SWN part of the order word.

In the stage of order execution, SWN is set in the register DVN. The control signal generator judges whether the designated flip-flop is set, according to the signals present on the signal lines 73 and 74. When the flip-flop is found set, the control signal generator judges that the branch condition is satisfied, thereby supplying a signal to C15, and opening the gate 72. As a result, the address part of the order stored in MBR is set in AR1, and the execution of order is completed. If the flip-flop is not set, the execution of this order is immediately terminated.

The message judge order is executed so that the student's input message stored in the fixed region of the memory device 5 is logically compared, character by character, with the expected message given by the order and, when coincidence is present in all the characters, the flip-flop CR is set and, it not, the flip-flop CR is reset.

THe expected message is stored following the first place of the order. The number (m) of characters of the message is indicated in the order word. In the stage where the order is read out, the number (m) of characters to be compared is set in the subtraction counter COUNT, and the address of the first character of the expected message is stored in AR1. When this order is read, the control signal generator 36 sends a pulse signal to the signal line 75 to set the flip-flop CR. At the same time, the control signal generator sends a pulse signal to C5 to open the AND gate 53 via OR gate 52. As a result, the first address in which the student's input message is stored is set in AR2. (This first address is provided from the fixed address generator circuit 54). Thus, the circuit is ready for operation of character-by-character logical comparison. Forst, a signal is sent to C1, the gate 37 is opened, and the contents of AR1 are supplied as an address to the memory device 5. Then the same control operation as in the load order is performed, whereby one character of the expected message is transferred to the accumulator ACC. After this operation, the control signal generator 36 delivers a pulse signal via the signal line 45, whereby the address of AR1 is increased by 1. Then a signal is supplied C2, the gate 55 is opened, and the address of AR2 is given to the memory device 5. Then the same control operation as in the subtract order is performed, whereby the character code of the corresponding student's input message is subtracted from the character code of the expected message stored in ACC. The result of this subtraction remains in ACC. When this operation is completed, a pulse signal is delivered via the signal line 56 from the control signal generator 36, and the address of AR2 is increased by 1. When the two character codes are coincident with each other, the result of the subtraction becomes 0, and 1 output appears on the signal line 70. If this output does not appear on the signal line 70, the control signal generator 36 sends a pulse signal to the signal line 76, to reset the signal line 70, the control signal generator does not operate to reset the flip-flop CR. Then the control signal generator generates a pulse signal via the signal line 47, to decrease the contents of the subtraction counter COUNT by 1. When the contents of COUNT are not 0 after this subtraction, this shows that there remain characters to be compared. If so, the foregoing comparison operation is performed on the succeeding characters. When the contents of COUNT is 0, this shows that the comparison of all the characters is completed. Thus, the execution of this order is terminated.

The unconditional branch order is to designate that the program is branched unconditionally to the address indicated by the address part of the order word. When this order is executed, the control signal generator is operated so that a signal is sent to C15, the gate 72 is opened, and the address part of the order word stored in MBR is set in AR1. Thus, the execution of this order is completed.

The request order as shown in FIG. 3 (d) is used when a request for supply of the next step program is raised to the computer which is a program-feeding device, or a request is made to the computer to perform necessary processing. Also, this order is executed to supply the computer with data for discriminating the kind of request.

The request order has the same format as the presentation order. In this order, therefore, the control circuit shown in FIG. 4 is operated in the same manner as in the presentation order, except that a patter 0100 is assigned to DVN to designate operation by the computer. When the computer is designated by DVN a signal is sent to C16, the AND gate 77 is opened, and the data of bus 41 is suppled to the computer via the OR gate 80. The strobe signal which indicates the timing at which the computer takes in the data is applied to ST4. When the computer finishes reading one word and is ready to read the additonal data, the computer sends an end signal via the signal line TERM 4. This operation is performed in the same manner as in the presentation order. When the execution of the request order is over, the control signal generator circuit 36 does not immediately go over to the next order but waits for an indication supplied from the computer. During the period the control signal generator 36 halts execution of the order, necessary information is exchanged between the computer and the control circuit. This information exchange is controlled by the command given from the computer. The control signal generator 36 decodes this command and performs a control operation according to the given command. Three kinds of command are used; the READ command for the computer to read the study result data stored on the side of the device, the WRITE command for supplying programs to the memory device 5, and the START command for starting execution of the supplied program. The READ command comprises a command for reding the student's input message or data of study result stored in the memory device 5, a command for reading the contents of flip-flops S1, S2, . . . S8 and TU, and a command for reading the response requiring time stored in the counter 11. The command given from the computer consists of the part indicating the command code and the part indicating the address.

The command from the computer is sent over the signal line 81. The timing at which this command is received by the side of the device is indicated by the stobe pulse sent via the signal line CST.

By this strobe pulse, the AND gates 82 and 84 are opened. The part indicating the command code is set in the register OR via the gate 82, and the part indicating the address is set in AR1 via the gate 84. Information transfer is initiated by the request pulse given to the signal line REQ from the computer. This request pulse is supplied to the control signal generator, to open the AND gate 83 whereby the data present on the signal line 81 is transfered to MBR.

When the command is for the request for transferring the contents of the flip-flops S1, S2, . . . S8 and TU, a signal is supplied to C17 by the control signal generator 36, the gate 78 is opened, and the necessary data is supplied to the computer. When the computer delivers a request pulse to the signal line REQ, the control signal generator 36 sends a strobe signal to ST4, whereby the computer reads the necessary data. The same operation as above is performed when transfer of the response requiring time stored in the counter 11 is requested by the command. In this case, a signal is sent to C18, the AND gate 79 is opened, and the corresponding data is supplied to the computer.

When data transfer from the memory device 5 is requested by the command, the control operatin is performed in the following manner. As described above, the address is set in AR1 in the stage of command delivery. When the command is received, a signal is sent to C16 by the control signal generator 36, the gate 77 is opened, and the data on bus 41 is sent to the computer.

The computer then generates a request pulse over the signal line REQ, whereby the control signal generator circuit 36 starts operation for reading the data indicated by the address of AR1 to MBR. Namely, a signal is sent to C1, the gate 37 is opened, and the address of AR1 is supplied to the memory device 5. Then the control signal generator generates a read signal. As a result, the necessary data is read to MBR and given to the computer by way of the bus 41. After this operation, the data is rewritten by the write signal. A pulse signal is generated on the signal line 45, and the address of AR1 is increased by 1. When the data is read to MBR, the control signal generator 36 generates a strobe signal to ST4, to make the computer read the necessary data at this time. The computer generates a request pulse in succession, whereby the above operation is repeated. Thus data can be read in succession from the address first designated by the command.

When data transfer to the memory device 5 is requested by the command, the following operation is performed. In this case also, the address is set in AR1 in thestage of command delivery. The computer generates data over the signl line 81 and delivers a request pulse to the signal line REQ. This pulse is given to the control signal generator 36, the gate 83 is opened, and the data present on the signalline 81 is set in MBR. The control signal generator, when given the request pulse, supplies a signal to C1, to open the gate 37 and supplies the memory device 5 with the address of AR1. At the same time, the control signal generator generates a write signal, to store the data of MBR in the address of AR1. Then the control signal generator generates a pulse signal on the signal line 45, thereby increasing the address of AR1 by 1. At the same time, the control signal generator delivers a pulse signal to TERM, thereby informing the computer of the end of the data storage. The computer again sends data over the signal line 81, and generates a request pulse. Thus the same operation as above is repeated. In this manner, it is possible for the computer to write data in succession from the address first indicated by the command.

When the command requests starts of order execution, the computer delivers a request pulse to the signal line REQ. As a result, the control signal generator generates a pulse signal to the signal line 85, thereby resetting AR1. As a result, AR1 indicates the address 0 which is the first address of the program. At the same time, the control signal generator starts operation of the order read phase for reading an order. Then the foregoing order execution operation is performed.

As has been described, the instructional device of this invention illustrated in FIGS. 1 and 4 has a control circuit capable of permitting selection of optimum educational approach to meet the ability and the step of study of the individual student. Hence, this instructional device provides a large teaching versatility similar to that obtainable in the conventional instructional device using a computer.

the control circuit is designed to control the elements which organize the instructional device to perform specific operations according to a simple program comprising in combination four different orders: the presentation order, pause order, judge order and request order. According to this invention, in comparison with the conventional system using a computer, the program used is very simple and the overall composition of the device is also simple. Thus, the device of this invention can be produced at a low cost.

Furthermore, the instructional device of this invention, when associating a computer for use in place of the program-feeding device, permits realization of highly useful, versatile educational capabilities in addition to the foregoing control functions available with a instructional device alone.

We claim:

1. An instructional apparatus comprising a plurality of student stations and a program-feeding device for storing and supplying programmed data to be used by a student wherein each said student station comprises:
   display means for displaying data for the use of said student;
   input means for enabling the student to write information into a random access memory in response to data displayed on said display means;
   a random access memory for storing the program supplied from the program-feeding device and storing various information produced as a result of program execution;
   control means coupled to said display means, input means, program-feeding device and random access memory, including:
   means for writing in only one step-program supplied from the program-feeding device at a predetermined location of said random access memory, said one step-program being comprised by a presentation order, a pause order, a judge order and a request order;
   means, responsive to a presentation order, for supplying selected information to said display means to present questions to a student;
   means, responsive to the pause order, for temporarily storing said information from the student at a predetermined location of said random access memory through his operation of said input means in response to the information displayed on said display means;
   means, responsive to the judge order, for comparing said information from said student with expected response data and for evaluating and judging the result of said comparison; and
   means, responsive to the request order, for designating a subsequent step-program to be executed and for delivering a request signal to said program-feeding device.

2. An instructional apparatus according to claim 1, in which said selected information supplying means comprises:
   a first register, coupled to said random access memory, for storing a signal representative of an address within said memory;
   a control signal generator circuit for generating a read signal for reading an instruction into the address designated by said first register;
   a second register, coupled to said control signal generator circuit, for temporarily storing a code which designates the type of said read instruction;
   a third register, coupled to said control signal generator circuit, for temporarily storing a code which designates a particular display means to be operated in response to said read instruction;
   a counter, coupled to said control signal generator circuit, for temporarily storing a signal which designates the word length of data to be presented according to said read instruction;
   means for supplying, from said control signal generator circuit to said first register, a signal for changing the contents of said first register, so that the contents of said first register indicate the next address each time one word is read from said memory;
   means for supplying, from said control signal generator circuit to said counter, a signal for subtracting a specific value from the contents of said counter each time one word of the information read from said memory is sent to said designated display means; and
   means for supplying, from said control signal generator circuit to said display means, a signal for instructing the designated display device to accept information according to the contents of said second and third registers.

3. An instructional apparatus according to Claim 2, in which said input means includes a keyboard comprising
   message keys for the student to input his answer or other information,
   response keys for discriminating the type of student's response and for indicating the end of a student's response, and
   a key for requesting the cancellation of input information.

4. An instructional apparatus according to Claim 3, further including a first gate through which the output of said message key is applied to said control means, and a first flip-flop, responsive to said control signal generator circuit and being connected to said first gate and wherein said first gate is controlled by the output of said first flip-flop to be set by a signal from said selected information supplying means, when the student's response is terminated.

5. An instructional apparatus according to Claim 1, in which said temporarily storing means comprises:
   a control signal generator circuit;
   a memory buffer register for temporarily storing the output of said input means;
   a fixed address generator for indicating the address of a predetermined region of said random access memory;
   a first register for temporarily storing an indication from said fixed address generator;
   means for supplying, from said control signal generator circuit to said random access memory, a write signal for writing in said memory the information stored in said memory buffer register; and
   means for supplying, from said control signal generator circuit to said first register, a signal for changing the contents of said first register to the next address each time one word is written into said random access memory.

6. An instructional apparatus according to claim 5, in which said temporarily storing means further comprises
   an end-code generator, and
   a first gate, responsive to the output of said end-code generator, for supplying said memory buffer register with the output of said end-code generator at the end of the information supplied from said input means and
   further including means for storing the end-code at the end of the student's response in said random access memory.

7. An instructional apparatus according to claim 1, in which said comparing means comprises:
   a control signal generator circuit;
   an accumulator for storing information;
   an adder circuit connected to said accumulator so that the output of said accumulator is applied to the summand side input terminal of said adder circuit, and the output of said adder circuit is applied to the input of said accumulator;
   a first register to be set at the address of said random access memory in which numerical data is stored;
   means for supplying, from said control signal generator circuit to said memory, a signal for reading information from the address indicated by said first register; and
   means for applying the signal read from said memory to the addend side input terminal of said adder circuit.

8. An instructional apparaus according to claim 1, in which said comparing means comprises:
   a control signal generator circuit;
   an accumulator in which information to be stored in said memory is stored;
   a first register in which the address to be stored is temporarily stored;
   a memory buffer register;
   a first gate, controlled so that the information in said accumulator is transferred to said memory buffer register by the signal from said control signal generator; and
   means for supplying, from said control signal generator to said random access memory, a write signal for writing the information stored in said temporarily storing means into the address of said random access memory, which address is indicated by the contents of said first register.

9. An instructional apparatus according to claim 1, in which said comparing means comprises:
   a first register in which an order code to be compared with a student's response information is set;
   a counter in which the information indicating the word length of information expected from said input means is set;
   a second register in which the address of the first character of the expected information stored in said memory is stored;
   a third register in which the first address of said student's input information is stored;
   an accumulator;
   a control signal generator circuit;
   means for supplying, from said control signal generator circuit to said memory, a read signal for reading information in the address indicated by said second register according to the state of said first register;
   means for transferring said read signal to said accumulator;
   means for supplying, from said control signal generator circuit to said second register, a signal for transferring the contents of said second register to the next address after said transfer of said read signal to said accumulator;
   means for supplying, from said control signal generator circuit to said third register, a signal for reading the information in the address indicated by said third register;
   means for applying a student's input information to said accumulator through an inverter, which inverts the bit signals of said student's input information;
   a flip-flop, coupled to said control signal generator, which is set when the contents of said accumulator are not zero; and
   means for supplying, from said control signalgenerator circuit to said counter, a signal for subtracting a specific value from the value of said counter each time the comparison of one character ends; and
   means for effecting the repetition of the operation of said comparing means until the contents of said counter become zero.

10. An instructional apparatus according to claim 1, in which said comparing means comprises:
    a plurality of flip-flops, set in response to information supplied from said input means;
    a flip-flop set according to whether or not the student's information response message is coincident with expected information;
    a first register for storing an order code;
    a second register for storing a code which designates one of said flip-flops of said plurality;
    a memory buffer register for storing a code which indicates a specific address of said random access memory;
    a control signal generator circuit, coupled to receive a set signal from the flip-flop designated by said second register when this flip-flop is in the set state;
    a third register set according to an address of said memory; and
    means for supplying, from said control signal generator circuit to a gate, a pulse for controlling said gate, so that the information in said memory buffer register is transferred to said third register when the designated flip-flop is delivering a set signal.

11. An instructional apparatus according to claim 1, inwhich said comparing means comprises:
    a control signal generator circuit;
    an accumulator in which arbitrary information can be stored;
    a decision circuit for judging whether the contents of said accumulator are positive, zero or negative; and
    means for supplying said control signal generator circuit with a signal corresponding to the judged result.

12. An instructional apparatus according to claim 1, in which said temporarily storing means comprising:
    a buffer register for temporarily storing the result of a student's response placed in said input means, by sequentially storing the student's input information;
    a plurality of flip-flops for storing information corresponding to the type of student's responses;
    a counter for counting the student's response time; and a first flip-flop for controlling application of information to said memory, said first flip-flop being set in response to the execution of a pause order permitting the entry of a student's response, and wherein said first flip-flop is reset when one of the flip-flops of said plurality is set upon termination of the student's response or when a second flip-flop, responsive to said counter, is set as the result that the student's response time has elapsed, and thus the student's response is allowed, and the result of student's response is stored, the student's response requiring time being counted only when said first flip-flop is in the set state.

13. An instructional apparatus according to claim 1, in which said program-feeding device includes means for continuously feeding individual programs based on a request order given once.

14. An instructional apparatus according to claim 1, wherein said apparatus further includes access to a computing means and in which said designating means comprises:

a first register for storing a signal which designates an address within said random access memory;

a control signal generator circuit which generates a signal for reading an order from the address designated by said first register;

a second register for temporarily storing a code which designates the type of read order;

a third register for temporarily storing a code which designates access to said computing means according to said read order;

a counter for temporarily storing a signal which designates the word length of information requested by said read order;

means for supplying, from said control signal generator circuit to said first register, a signal for changing the contents of said first register, so that the contents of said first register indicate the next address each time one word is read from said memory;

means for supplying, from said control signal generator circuit to said counter, a signal for subtracting a specific value from the contents of said counter each time one word of the information read from the memory is transmitted to said computing means; and means for supplying from said control signal generator circuit a signal for enabling said computing means to accept said information according to the contents of said second and third registers.

* * * * *